US007518811B2

(12) United States Patent
D'Eon

(10) Patent No.: US 7,518,811 B2
(45) Date of Patent: Apr. 14, 2009

(54) FIXED WINDOW ARRANGEMENT

(75) Inventor: Anthony D'Eon, Lower West Pubnico (CA)

(73) Assignee: Marinelite Windows Limited, Middle West Pubnico (CA)

(*) Notice: Subject to any disclaimer, the term of this patent is extended or adjusted under 35 U.S.C. 154(b) by 357 days.

(21) Appl. No.: 11/393,726

(22) Filed: Mar. 31, 2006

(65) Prior Publication Data

US 2007/0234943 A1 Oct. 11, 2007

(51) Int. Cl.
*G02B 7/02* (2006.01)
*E06B 3/28* (2006.01)

(52) U.S. Cl. ........................................ 359/819; 52/203

(58) Field of Classification Search ......... 359/819–822; 52/203, 204, 786.1, 308
See application file for complete search history.

(56) References Cited

U.S. PATENT DOCUMENTS

| | | | | |
|---|---|---|---|---|
| 3,967,424 A | 7/1976 | Gates | .......................... | 52/208 |
| 4,364,595 A | 12/1982 | Morgan et al. | ........... | 296/96.11 |
| 6,557,480 B1 | 5/2003 | Nuss | .......................... | 114/173 |
| 7,278,241 B2 * | 10/2007 | Wirawan | ..................... | 52/203 |
| 2003/0110718 A1 * | 6/2003 | Boisvert | ...................... | 52/208 |
| 2007/0234943 A1 * | 10/2007 | D'Eon | ........................ | 114/177 |

FOREIGN PATENT DOCUMENTS

| | | |
|---|---|---|
| EP | 0 874 752 | 11/1998 |
| GB | 1512979 | 6/1978 |

* cited by examiner

*Primary Examiner*—Mohammed Hasan
(74) *Attorney, Agent, or Firm*—Nixon & Vanderhye P.C.

(57) ABSTRACT

A fixed window for use in an opening in a supporting structure. The window comprises a glazing material, a spigot, an interior trim ring and an exterior trim member. The glazing material is bonded directly to the supporting structure, which provides a window that is less likely to be pushed through the opening in the supporting structure when exposed to harsh environmental conditions and is less likely to leak when compared to framed windows. The exterior trim member is dimensioned to substantially shield the sealant used to bond the various components together from ultraviolet radiation, thus permitting use of stronger, ultraviolet radiation sensitive sealants. The components that comprise the window frame that holds the glazing material are produced from a unitary blank that can accommodate glazing materials of various thickness and can be installed on supporting structures having various thickness.

16 Claims, 2 Drawing Sheets

FIXED WINDOW ARRANGEMENT

FIELD OF THE INVENTION

The present invention relates generally to windows, and more specifically to fixed windows for use in an opening in a supporting structure, such as a wall of a vehicle, an article of heavy equipment or stationary structure.

BACKGROUND OF THE INVENTION

The constant exposure to harsh environmental conditions can significantly deteriorate the structural components of a window, especially windows on vehicles such as boats that are in frequent use for commercial purposes, such as fishing and are exposed to rapidly changing environments. The junction between two dissimilar materials on a window is often a common point of failure. This is especially true for the junction between the window pane or glazing material and the window frame holding it therein. Over time, corrosion forms on the window frame and breaks the watertight seal between the glazing material and the window frame. Therefore, in rough conditions at sea or during rainstorms the window is prone to leak.

Window frames for use in boats made of a corrosion-resistant material such as aluminum or stainless steel have been contemplated by the prior art. However, these window frames are typically overly expensive for use in a recreational or small commercial applications. Accordingly, attempts have been made to provide a marine window and frame that is less prone to failure, while economical enough for use on smaller types of watercraft.

Boisvert (United States Patent Publication No. 2003/0110718 A1) discloses a marine window assembly for installation within a boat cabin wall. The glazing material is sealed directly to the cabin wall and clamped in place by a shielding member that is positioned around the periphery of the glazing material on the outside of the cabin. The shielding member is fastened to the cabin wall by bolts that extend through channels drilled in the cabin wall and are secured by nuts applied from inside the cabin. The window assembly disclosed by Boisvert does not use a frame to hold the window, however requires that first and second transverse sections are cut around the perimeter of the opening for the glazing material to be positioned in the plane defined by the outer surface of the cabin wall. Moreover, holes must be drilled into the cabin wall to accommodate the bolts that are used to secure the shielding member to the cabin wall. The modifications to the cabin wall and opening therein, increase the amount of time and skilled required to install the window. In addition, the holes drilled into the cabin wall add a potential point of failure, wherein water can penetrate into the cabin.

Gates (U.S. Pat. No. 3,967,424) discloses a frameless boat window that is sealed directly to outer surface of a cabin wall. The glazing material is dimensioned to be larger than the window opening in the cabin wall. A fin is bonded to the interior surface of the glazing material which extends through the opening in the cabin wall and is fastened to the interior trim in order to clamp the window to the cabin wall. The glazing material is sealed to the cabin by a sealant. Since the sealant is directly exposed to the sunlight, it must be able to withstand ultraviolet radiation. Silicone based sealants or adhesives are resistant to ultraviolet radiation, however they lack the strength of polyurethane sealants, which are sensitive to ultraviolet radiation. Therefore, windows that are adhered using silicone based sealants are more prone to leakage and failure.

SUMMARY OF THE INVENTION

It is an object of the present invention to provide a window and window frame for use in an opening in a supporting structure that addresses the limitations of the prior art.

The window frame of the present invention can be easily adapted to accommodate glazing materials of various thickness as well as being installed on supporting structures having different thicknesses. The glazing material of the present invention can be bonded directly to the exterior surface of the supporting structure without being limited by the type of sealant that is used to seal the glazing material to the supporting structure.

According to an aspect of the present invention there is provided a fixed window for use in an opening in a supporting structure. The window comprises a glazing material having interior and exterior surfaces and dimensioned to have a surface area greater than an area defined by the opening; a spigot attached to the interior surface of the glazing material; an interior trim ring for attachment to the spigot; and an exterior trim member for attachment to a peripheral area of the exterior surface of the glazing material. The exterior trim member is dimensioned to substantially extend the distance from the periphery of the glazing material to a position beyond the perimeter of the opening.

According to a second aspect of the present invention, there is a provided a method for producing the window comprising the steps of: extruding a unitary blank comprising the exterior trim member, spigot and interior trim ring; extracting the exterior trim member, spigot and interior trim ring from the unitary blank; attaching the exterior trim member to the peripheral area of the exterior surface of the glazing material; attaching the spigot to the interior surface of the glazing material; attaching the glazing material to an exterior surface of the supporting structure adjacent to the perimeter of the opening; and fastening the interior trim ring to the spigot.

According to a third aspect of the present invention, there is provided a window frame for use in an opening in a supporting structure. The window frame comprises: a spigot for attachment to an interior surface of the glazing material; an interior trim ring for attachment to the spigot; and an exterior trim member for attachment to a peripheral area of an exterior surface of the glazing material. The exterior trim member is dimensioned to substantially extend the distance from the periphery of the glazing material to a position beyond the perimeter of the opening.

According to a fourth aspect of the present invention, there is provided a method for producing the window frame comprising the steps of: extruding a unitary blank comprising the exterior trim member, spigot and interior trim ring; and extracting the exterior trim member, spigot and interior trim ring from the unitary blank.

BRIEF DESCRIPTION OF THE DRAWINGS

These and other features of the invention will become more apparent from the following description in which reference is made to the appended drawings wherein.

DETAILED DESCRIPTION OF THE INVENTION

Figure 1:
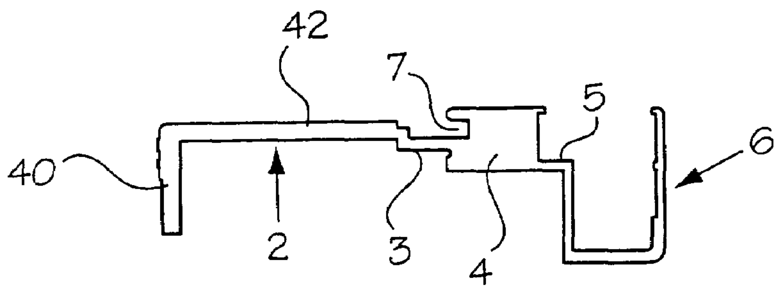
FIG. 1 is a cross-sectional view of a unitary blank according to an embodiment of the present invention.

An exemplary example of a fixed window of the present invention is shown in FIGS. 1 to 5. The fixed window is described with reference for use in an opening on a cabin wall of a boat. However, the fixed window could be adapted for use on most supporting structures, such as walls of vehicles, including cars, vans, trucks, trailers, recreational vehicles, and airplanes. In addition, the window may be installed on any articles of heavy equipment, such as cranes and excavators, or stationary structures, such as toll booths or workstations.

The fixed window (20) generally comprises a glazing material (10), a spigot (4), an exterior trim member (6) and an interior trim ring (2). The window (20) can be installed in an opening cut in the wall of a cabin or wheelhouse of a boat, where the window is exposed intermittently to water either from the sea or rain. In addition, if proper waterproof sealants are used the window (20) could be installed below the waterline of the boat.

The glazing material (10) accommodated in the window frame of the present invention can be formed from any translucent or semi-translucent material. Typically, the glazing material (10) is made from laminated or tempered glass, polycarbonate or acrylic, which are all able to withstand impact from waves and debris churned up by the sea. By dimensioning the glazing material (10) to be have a surface area greater than the area defined by the opening in the cabin, there is less chance for the glazing material (10) to be pushed through the opening into the cabin during stormy conditions. As a result of the glazing material (10) being bonded directly to the cabin wall (12) and the flexibility of the size of the exterior trim member (6) to be readily adjusted, glazing materials (10) of various thicknesses can be easily accommodated in the window frame of the present invention (see FIGS. 3A and 3B).

Figure 3A:
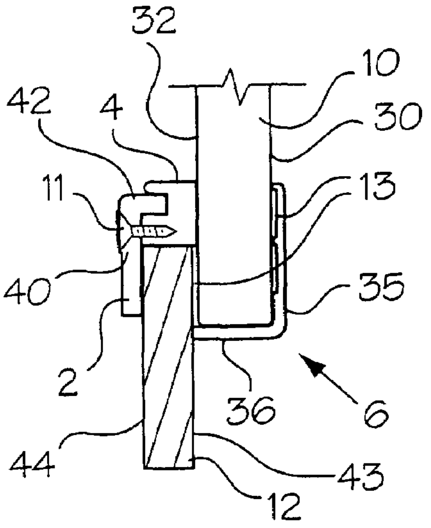
FIG. 3A is a cross-sectional view of a window according to an embodiment of the present invention.
Figure 3B:
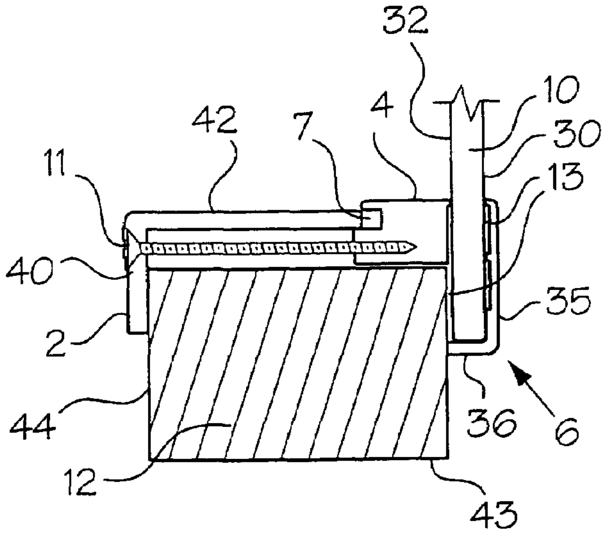
FIG. 3B is a cross-sectional view of a window according to another embodiment of the present invention.

A spigot (4) is bonded to the surface (32) of the glazing material (10) that faces the interior of the cabin when the window (20) is fully installed, at a position offset from the perimeter of the glazing material (10) (FIGS. 3A and 3B). The distance between the perimeter of the glazing material (10) and the spigot (4) attached to the interior surface (32) of the glazing material (10) should be at least width enough to receive enough sealant (13) to securely bond the glazing material (10) to the surface (43) of the cabin wall (12) in contact with the surrounding environment. Preferably, the spigot (4) is between 0.25 and 1 inch in length. Typically, when bonded to the glazing material (10), the spigot (4) extends from the interior surface (32) of the glazing material (10) to a point that corresponds to the thickness of the cabin wall (12) (FIG. 3B). The size of the spigot (4) can be adjusted to accommodate cabin walls (12) of various thickness by trimming the end of the spigot (4) that is eventually bonded to the glazing material (10). However, in applications wherein the cabin wall (12) is of above average thickness it may not be desirable or possible to provide the spigot (4) in size corresponding to thickness of the cabin wall (12) (FIG. 3A). In these cases the interior trim ring (2) is adjusted in size to accommodate the thickness of the cabin wall (12).

The ability to adjust the size of the spigot (4) permits installation of the window on a variety of boats without having to create a custom blank for each window frame desired. Moreover, the manufacturer of the window (20) does not have to retain in stock windows for use in boats with different cabin wall (12) thicknesses. Instead, the window manufacturer can stock window frame blanks (1) corresponding to the various shapes of the openings in the cabin walls (12), without having to concern themselves with the thickness of the cabin wall (12) or glazing material (10) to be used, thus decreasing inventory costs for the manufacturer.

Once the window (20) is positioned in the opening in the cabin wall (12), an interior trim ring (2) is attached to the spigot (4) and positioned on the surface of the cabin wall (12) facing the interior of the cabin in order to provide a finished appearance to the window (20), when viewed from the interior of the cabin. Moreover, the interior trim ring (2) provides additional support to the window (20) by clamping the window (20) against the interior surface (44) of the cabin wall (12). The interior trim ring (2) can be attached to the spigot (4) by either a fastener (11) or a structural sealant.

Figure 2:
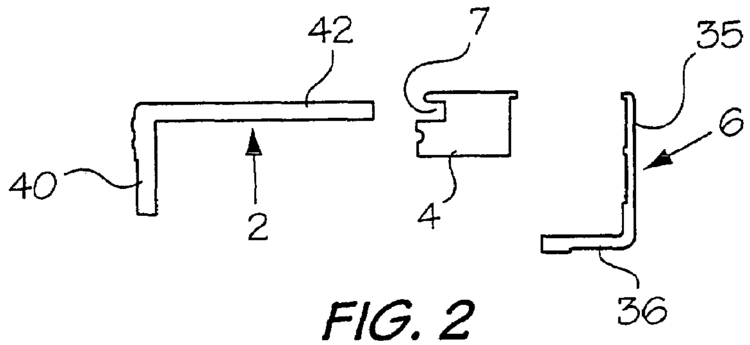
FIG. 2 is a cross-sectional view of the individual components of a window frame according to an embodiment of the present invention.

The interior trim ring (2) comprises a casement section (40) and an extension section (42) (FIG. 2). The casement section (40) is positioned substantially parallel to the glazing material (10) and generally covers the gap between the spigot (4) and the edge of the opening in the cabin wall (12). The extension section (42) is positioned substantially perpendicular to the casement section (40) and bridges the gap between the casement section (40) of the interior trim ring (2) and the spigot (4). The free end of the extension section (42) can be inserted into a recess (7) provided in the spigot (4) to provide a finished appearance to the window (20). In addition, the length of the extension section (42) can be modified to accommodate boats with cabin walls (12) of various thickness (FIGS. 3A and 3B). For boats with cabin walls (12) that have some curvature to them, the radius of the curve can be scribed onto the extension section (42) and the extension section (42) subsequently trimmed to allow the interior trim ring (2) to rest flush against the cabin wall (12). Accordingly, from inside the cabin of the boat, the window will appear as if it were custom fabricated, when in fact the window frame was fabricated from a standard blank (1) that can used for a wide variety of windows.

An exterior trim member (6) is bonded to exterior surface (30) of the glazing material (10) to protect the sealants (13) from harmful ultraviolet radiation and to provide the window (20) with a finished appearance. The exterior trim member (6) is essentially L-shaped when viewed in cross-section (FIG. 2). As shown in FIG. 3A, the long arm (35) of the exterior trim member (6) extends from the perimeter of the glazing material (10) to a position beyond the perimeter of the opening in the cabin wall (12). Typically, the long arm (35) is dimensioned to substantially cover the sealant (13) applied to the interior surface (32) of the glazing material (10) to bond the spigot (4) to the glazing material (10) and the glazing material (10) to the exterior surface (43) of the cabin wall (12). Whereas the short arm (36) of the exterior trim member (6) extends from the exterior surface (30) of the glazing material (10) towards the exterior surface (43) of the cabin wall (12). The length of the short arm (36) of the exterior trim member (6) depends on the thickness of the glazing material (10) employed and the thickness of sealant (13) applied.

The positioning of the exterior trim member (6) and the spigot (4) peripherally and on opposite surfaces of the glazing material (10) provides additional strength to the glazing material (10), limiting the possibility of the glazing material (10) breaking in the middle portion thereof.

The window frame can be fabricated starting from a unitary blank (1) having the interior trim ring (2), spigot (4) and exterior trim member (6) formed therein (FIG. 1). Generally, the unitary blank (1) is produced from the process of plastic extrusion molding using polyvinyl chloride, which will eventually be used to produce a window frame that is inexpensive and able to withstand environmental factors. The unitary blank (1) and resulting window frame can also be manufactured from more expensive materials such as aluminum, brass, other plastics, in addition to other corrosion-resistant metals. Once the blank (1) is produced, it can be shaped in accordance with the shape of the opening in the cabin wall (12) in which it will be eventually installed. Common shapes for the window frame include squares, circles, rectangles, parallelograms, triangles and trapezoids.

The individual components of the window frame are cut from the unitary blank (1) depending on the specific requirements for the window (20) (FIG. 2). First connector (5) is cut near the section of the blank (1) that will eventually form the spigot (4) and along the section of the blank (1) that eventually forms the short arm (36) of the exterior trim member (6). The amount that needs to be cut from the short arm (36) of the exterior trim member (6) will depend on the thickness of the glazing material (10). Similarly, if the window (20) is to be installed on a relatively thin cabin wall (12) the section of the blank (1) that forms the spigot (4) can be cut near the first connector (5). The second connector (3) is also cut from the blank (1) in accordance with the requirements of the window opening. One cut is made near the spigot (4) and the other cut is made at the opposite end of the second connector (3) or along the section of the blank (1) that eventually forms the extension section (42) of the interior trim ring (2), depending on the thickness of the cabin wall (12).

Figure 4:
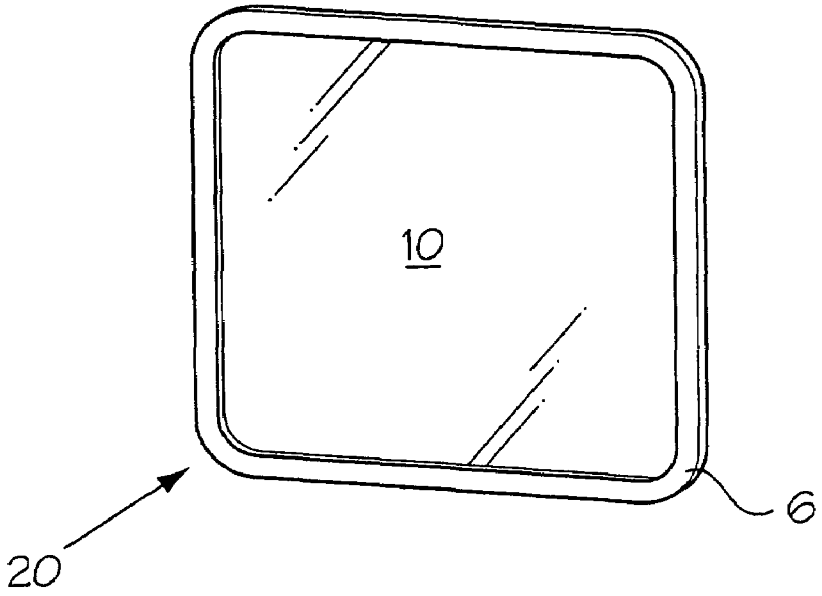
FIG. 4 is an exterior perspective view of a window according to an embodiment of the present invention.
Figure 5:
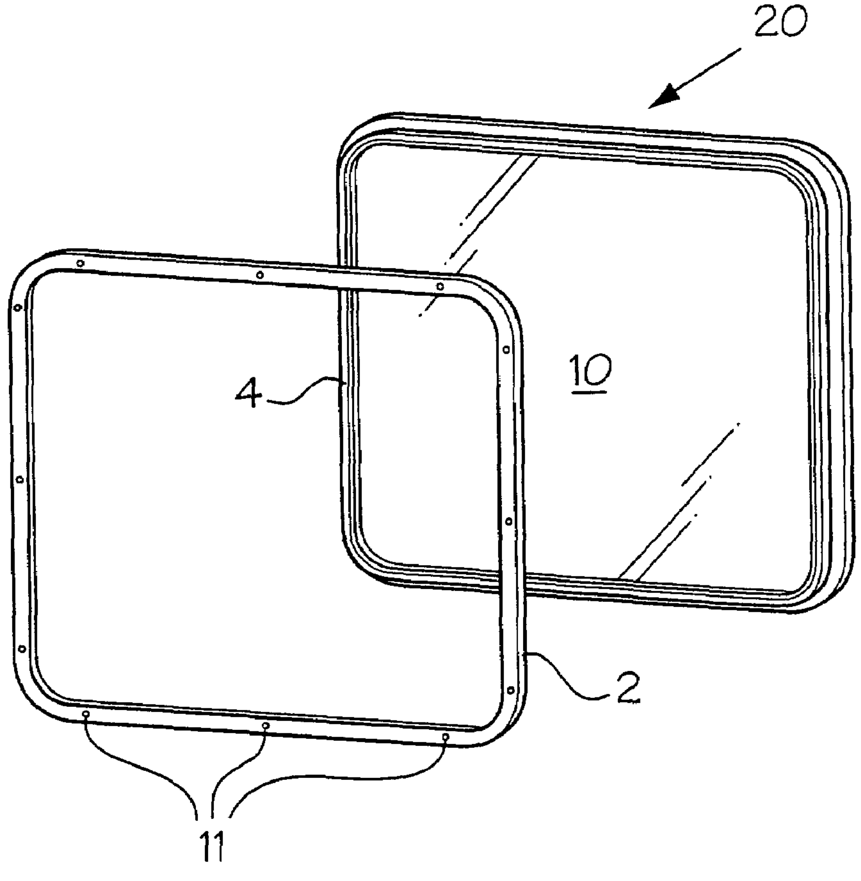
FIG. 5 is an interior perspective view of a window according to an embodiment of the present invention.

The individual components of the window frame are assembled to form the window (20) shown in FIGS. 4 and 5. The exterior trim member (6) is adhered to the glazing material (10) with the short arm (36) substantially covering the edge portion of the glazing material (10), which corresponds to the thickness of the glazing material (10), and the long arm (35) covering a portion of the exterior surface (30) of the glazing material (10) from the perimeter thereof to a position beyond the perimeter of the opening in the cabin wall (12). The spigot (4) is adhered to the interior surface (32) of the glazing material (10) at a position offset from the perimeter of the glazing material (10). Both the exterior trim member (6) and the spigot (4) can be adhered to the glazing material (10) by any suitable adhesive or sealant. The exterior trim member (6) generally protects the sealant (13) from ultraviolet radiation, thus most structural sealants and adhesives can be implemented for the purpose of bonding the exterior trim member (6) and spigot (4) to the glazing material (10). For example, polyurethane sealants, which are typically sensitive to ultraviolet radiation, can be used to ensure a strong bond between the elements of the window frame and glazing material. In addition, sealants such as silicone and silyl modified polymers can be used, depending on the application and the desire strength of the bond.

Once the spigot (4) and the exterior trim member (6) are bonded to the glazing material (10), the window (20) is ready for bonding to the exterior surface (43) of the cabin wall (12). The glazing material (10) is bonded directly to the exterior surface (43) of the cabin wall (12) by a sealant (13) which can be either the same or different from the sealant (13) that is used to bond the spigot (4) and exterior trim member (6) to the glazing material (10). The sealant (13) is typically applied using a applicator having a v-shaped tip. This method of deploying the sealant (13) allows for a near air-tight seal to be formed between the glazing material (10) and the exterior surface of the cabin wall (12).

When the glazing material (10) is bonded to the cabin wall (12), the spigot (4) will extend through the opening in the cabin wall (12). The interior trim ring (2) is attached by first inserting the open end of the extension section (42) into the recess (7) of the spigot (4). The interior trim ring (2) is clamped against the interior surface (44) of the cabin wall (12) by fastening the interior trim ring (2) to the spigot (4).

The present invention has been described with regard to preferred embodiments. However, it will be obvious to persons skilled in the art that a number of variations and modifications can be made without departing from the scope of the invention as described herein.

I claim:

1. A fixed window for use in an opening in a supporting structure, the window comprising:
- a glazing material having interior and exterior surfaces and dimensioned to have a surface area greater than an area defined by said opening;
- a spigot attached to the interior surface of the glazing material;
- an interior trim ring for attachment to the spigot; and
- an exterior trim member for attachment to a peripheral area of the exterior surface of the glazing material,
- wherein the exterior trim member comprises: a long arm extending from the perimeter of the glazing material to a position beyond the perimeter of the opening; and a short arm extending from the long arm toward the supporting structure, and
- wherein the exterior trim member is dimensioned to substantially extend the distance from the periphery of the glazing material to a position beyond the perimeter of the opening.

2. The window according to claim 1, wherein a sealant is used to attach the glazing material to the supporting structure, the spigot to the interior surface of the glazing material, the interior trim ring to the spigot, and the exterior trim member to the glazing material.

3. The window according to claim 2, wherein the sealant is selected from the group consisting of silicone-based sealants, polyurethane-based sealants, and silyl modified polymers.

4. The window according to claim 1, wherein the interior trim ring is attached to the spigot by a fastener.

5. The window according to claim 1, wherein said glazing material is selected from the group consisting of laminated glass, tempered glass, polycarbonate and acrylic.

6. The window according to claim 1, wherein said interior trim ring comprises: a casement section positioned substantially parallel to said glazing material; and an extension section positioned substantially perpendicular to said casement section.

7. The window according to claim 6, wherein the extension section is adjustable for bridging a gap formed between the casement section and the spigot when the window is positioned in the opening.

8. The window according to claim 1, wherein the length of the short arm corresponds to the thickness of the glazing material.

9. A method for producing the window of claim 1 comprising the steps of:
- extruding a unitary blank comprising the exterior trim member, spigot and interior trim ring;
- extracting the exterior trim member, spigot and interior trim ring from the unitary blank;

attaching the exterior trim member to the peripheral area of the exterior surface of the glazing material;

attaching the spigot to the interior surface of the glazing material;

attaching the glazing material to an exterior surface of the supporting structure adjacent to the perimeter of the opening; and fastening the interior trim ring to the spigot.

10. The method according to claim 9, wherein the exterior trim member is connected to the spigot by a removable first connector element and the spigot is connected to the interior trim ring by a removable second connector element within the unitary blank.

11. The method according to claim 9, wherein a sealant is used to attach the glazing material to the exterior surface of the supporting structure, the spigot to the interior surface of the glazing material, the interior trim ring to the spigot, and the exterior trim member to the glazing material.

12. The method according to claim 11, wherein the sealant is selected from the group consisting of silicone-based sealants, polyurethane-based sealants, and silyl modified polymers.

13. The method according to claim 9, wherein the interior trim ring is fastened to the spigot by a fastener.

14. The method according to claim 9, wherein the glazing material is selected from the group consisting of laminated glass, tempered glass, polycarbonate and acrylic.

15. The method according to claim 9, wherein the interior trim ring comprises: a casement section positioned substantially parallel to the glazing material; and an extension section positioned substantially perpendicular to the casement section.

16. The method according to claim 15, further comprising the step of adjusting the length of the extension section prior to fastening the interior trim ring to the spigot.

* * * * *